US006195372B1

(12) United States Patent
Brown

(10) Patent No.: US 6,195,372 B1
(45) Date of Patent: Feb. 27, 2001

(54) CRYOGENICALLY-COOLED SOLID-STATE LASERS

(76) Inventor: David C. Brown, R.R. #1, Box 356J, Brackney, PA (US) 18812

( * ) Notice: Subject to any disclaimer, the term of this patent is extended or adjusted under 35 U.S.C. 154(b) by 0 days.

(21) Appl. No.: 09/070,531

(22) Filed: Apr. 30, 1998

Related U.S. Application Data

(60) Provisional application No. 60/056,128, filed on Aug. 19, 1997.

(51) Int. Cl.$^7$ ....................................................... H01S 3/04
(52) U.S. Cl. .............................. 372/34; 372/34; 372/89; 372/75; 372/35; 372/72; 372/38; 372/51; 372/55; 372/59; 372/36
(58) Field of Search ................................ 372/34, 89, 35, 372/72, 38, 51, 55, 69, 36, 75

(56) References Cited

U.S. PATENT DOCUMENTS

| 3,648,192 | * | 3/1972 | Birnbaum et al. ................... 372/68 |
| 3,676,798 | * | 7/1972 | McMahon ............................. 372/36 |
| 4,168,474 | * | 9/1979 | Pleasance ............................ 372/4 |
| 4,272,733 | * | 6/1981 | Walling et al. ...................... 372/20 |
| 4,306,278 | * | 12/1981 | Fulton et al. ....................... 362/259 |
| 4,431,269 | * | 2/1984 | Barnes Jr. .......................... 359/845 |
| 4,490,822 | * | 12/1984 | Walling et al. ...................... 372/41 |
| 4,514,698 | * | 4/1985 | Blumenthal et al. ................. 372/33 |
| 4,535,023 | * | 8/1985 | Whitlock ............................. 428/495 |
| 4,809,283 | * | 2/1989 | Harter ................................. 372/41 |
| 4,841,530 | * | 6/1989 | Chai et al. .......................... 372/41 |
| 4,995,046 | * | 2/1991 | Fan et al. ............................ 372/41 |
| 5,008,890 | * | 4/1991 | McFarlane .......................... 372/41 |
| 5,107,513 | * | 4/1992 | Sagie et al. ......................... 372/35 |
| 5,181,212 | * | 1/1993 | Moberg ............................... 372/22 |
| 5,245,623 | * | 9/1993 | McFarlane .......................... 372/69 |
| 5,309,457 | * | 5/1994 | Minch ................................. 372/34 |
| 5,526,372 | * | 6/1996 | Albrecht et al. ..................... 372/69 |
| 5,628,196 | * | 5/1997 | Farmer ............................... 62/51.1 |
| 5,682,397 | * | 10/1997 | Scheps ................................ 372/22 |
| 5,742,384 | * | 4/1998 | Farmer ............................. 356/141.4 |
| 5,897,847 | * | 4/1999 | Jursich et al. ....................... 423/219 |

OTHER PUBLICATIONS

Brown David C., "Heat, Fluorescence, and Stimulated–Emission Power Densities adn Fractions in Nd:YAG", Mar. 1998, vol. 34, No. 3, pp. 560–572.*

Fan T.Y., "Heat generator in Nd:YAG and Yb:YAG", Jun. 1993, vol. 29, No. 6, pp. 1457–1458.*

* cited by examiner

Primary Examiner—Frank G. Font
Assistant Examiner—Delma R. Flores Ruiz
(74) Attorney, Agent, or Firm—Alix, Yale & Ristas, LLP

(57) ABSTRACT

The average power capability of a solid-state laser is increased by cooling the lasing element to a cryogenic temperature. The laser pump chamber is configured to define a flow path for circulating cryogenic fluid. The cryogenic cooling is achieved for rod, slab, active-mirror or disc amplifier-type lasing elements.

24 Claims, 13 Drawing Sheets

US 6,195,372 B1

CRYOGENICALLY-COOLED SOLID-STATE LASERS

CROSS-REFERENCE TO RELATED APPLICATION

This application claims the priority of U.S. Provisional Patent Application No. 60/056,128 filed on Aug. 19, 1997.

BACKGROUND OF THE INVENTION

This invention relates generally to solid-state lasers. More particularly, this invention pertains to the thermo-mechanical properties of the optical material YAG, an acronym for yttrium aluminum garnet ($Y_3Al_5O_{12}$), the most commonly used solid-state laser material in the world.

Conventional YAG lasers, diode-pumped or flashlamp-pumped, have limits to the amount of average power they can produce. The limits are determined by the amount of heat generated during the optical pumping process, and by the strength of the material being pumped. Heat generation in such lasers is described in T. Y. Fan, "Heat Generation in Nd:YAG and Yb:YAG", IEEE Journal of Quantum Electronics, Volume 29, pages 1457–1459, 1993 and D. C. Brown, "Heat, Fluorescence, and Stimulated-Emission Power Densities and Fractions in Nd:YAG", IEEE Journal of Quantum Electronics, Volume 34, pages 560–572, 1998.

During high-average-power operation, a great deal of heat is generated. Heat is normally removed from the barrel of the rod or the surfaces of a slab. The rod or slab is conventionally cooled by flowing temperature controlled water through a surrounding channel or sheath. This causes a temperature gradient between the edge of the rod or slab which is coolest and the center which is hottest. The temperature gradient in turn produces stresses in the rod or slab that can become comparable to the intrinsic strength of the YAG. The strength of YAG is lowest on its barrel and faces that have been optically finished or ground. Rod barrels are typically ground but can also be polished. In either case defects, scratches and voids are found in the barrel that reduce the strength. Because polished surfaces have statistically smaller defects and scratches, they have higher strength than ground or roughened barrels. Reference is made to J. Marion, "Strengthened Solid-State Laser Materials," Applied Physics Letters, Volume 47, pages 694–696, 1985. Barrel roughening is often performed to eliminate or reduce parasitic oscillations in pulsed high-gain lasers. For CW lasers, all polished surfaces are usually acceptable.

When the thermally-induced stresses on the rod barrel become equal to the strength of the surface, the YAG material shatters and must be replaced. This limits the average power to input pumping below the fracture-limit. The amount can be calculated exactly and varies with the optical material composition, the size of the rod and the way in which the barrel surface has been prepared. The material thermal expansion coefficient, thermal conductivity, Poisson's ratio and Young's modulus figure in the calculations.

SUMMARY OF THE INVENTION

It has been discovered that it is possible to significantly increase the average power capability of a rod of YAG by cooling the material with fluids at low or cryogenic temperatures. Finally, it is also found that if a rod is operated with the same heat power density at 77° K as at 300° K, the thermal distortions due to thermal effects are significantly reduced. Similar characteristics are achieved in slab-type laser systems.

Briefly stated, the invention in a preferred form is a system for increasing the average power capability of a solid-state laser by cooling the laser crystal to a cryogenic temperature and then pumping the laser crystal. Cryogenic fluid is circulated along a path which is disposed in heat exchange relationship with the laser crystal. For embodiments which employ a rod, the fluid path is generally parallel to the longitudinal axis of the rod. For slab-type laser configurations, the fluid path is generally parallel to the plane of the slab and may be disposed on opposing sides of the crystal slab. The laser crystal may be pumped along a radiation path that traverses through the cryogenic fluid as well as some of the structures which define the cryogenic fluid channels.

The invention has applicability in connection with pumping sources which employ a diode, a diode array, a flashlamp, a laser or multiple lasers. The solid-state lasing crystal may comprise YAG with a lasing ion selected from the group consisting of Nd, Yb, Er, Tm, Ho and Cr. The lasing element may be of a rod, slab, active-mirror or disc amplifier form.

A fluid circuit connects a cryogenic reservoir with the laser pump chamber. A closed loop or open loop circulation system may be employed. For some embodiments, a refrigerator is disposed in the circuit connecting the cryogenic reservoir and the laser pump chamber. The pump chamber is internally configured to define the cryogenic fluid flow path in a manner which provides highly efficient pumping and cooling of the lasing element. The structures which define the cryogenic fluid flow path are constructed from materials which are optically transparent at the pump wavelength.

An object of the invention is to provide a new and improved laser system which has increased average power output capability.

Another object of the invention is to provide a new and improved solid-state laser system which operates in an efficient manner to produce a favorable power output by optimizing certain thermo-mechanical properties of the lasing element.

A further object of the invention is to provide a new and improved solid-state laser system which incorporates an efficient and cost effective cooling system for increasing the average power capability of conventional lasing crystals.

Other objects and advantages of the invention will become apparent from the specification and the drawings.

DETAILED DESCRIPTION OF THE PREFERRED EMBODIMENTS

Figure 1:
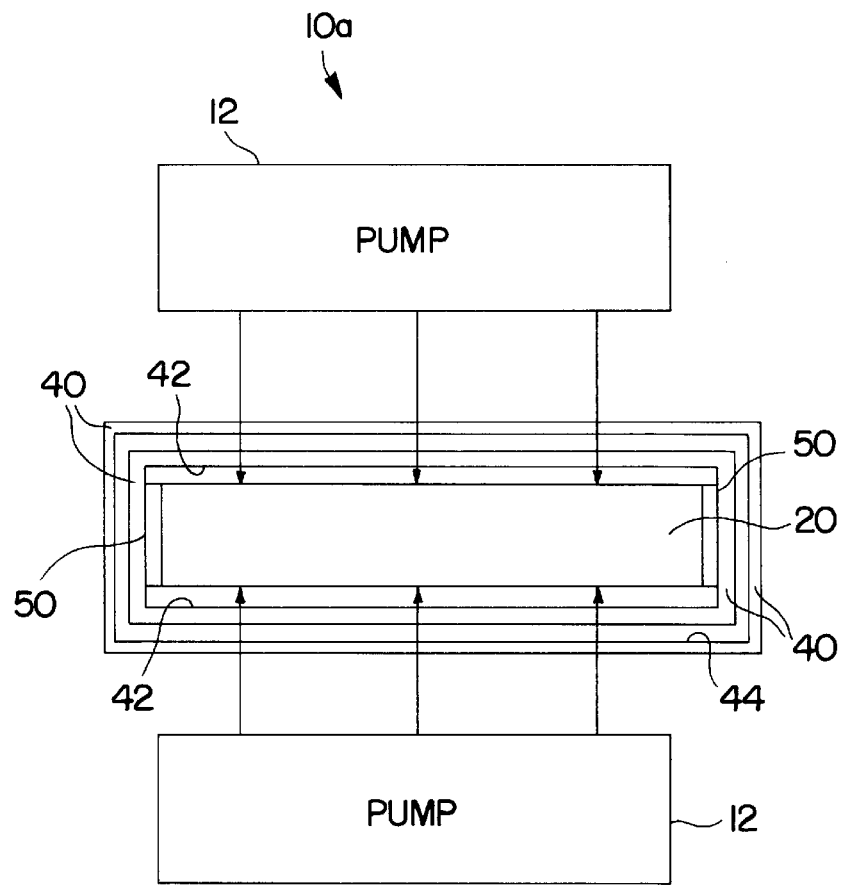
FIG. 1 is an end view, partly in schematic, of a cryogenically-cooled slab laser system incorporating longitudinal cooling in accordance with the present invention.

With reference to the drawings, wherein like numerals represent like parts throughout the figures, various laser systems incorporating the cryogenic cooling feature of the present invention are designated by the numeral 10 followed by a letter to denote the various embodiments. The disclosed embodiments primarily differ in the pump chamber/lasing element configurations which are the focus of FIGS. 1–15. Each of the foregoing systems 10 employs cryogenic cooling to increase the average power of a diode or flashlamp-pumped laser system. The laser pumping can be accomplished by a diode-array, a flashlamp or other optical pumping source 12. The lasing elements are pumped in the direction indicated by the heavy arrows.

The solid-state lasers typically employ a slab 20 or a rod 30. The slabs 20 preferably are rectangular or square in cross-section. The laser rods preferably are triangular, square or polygonal, including a polygon with any number of chords or a circular cross-section.

With reference to FIG. 1, the solid-state laser system 10a employs a glass or crystalline slab 20. The slab is enclosed by a dual panel, sleeve-like enclosure 40 which defines inner cooling plenums or channels 42 along the top and bottom slab faces through which a clear cryogenic fluid like liquid nitrogen is circulated. The cryogenic fluid may be either a liquid or a gas. An outer plenum or channel 44 is hollow to minimize heat transfer from the ambient air to the cryogenic fluid. The outer channel is subject to a vacuum which is an excellent insulator. Dry air or a low thermal conductivity gas may also occupy the channel 44. The enclosure 40 is constructed from a clear glass, crystalline or ceramic material with good transmission at the pump light wavelengths and should be anti-reflection (AR) coated to minimize pump losses. The slab 20 may also have optional side rails 50 whose purpose is to regulate heat flow through the slab sides. The side rails 50 could be totally passively insulating, partially insulating or an active transfer structure where fluid passes through it. Coolant flow in this implementation is longitudinal along the slab long dimension (orthogonal to the plane of the drawing). The hollow channel 44 may also be replaced with a solid substrate that has low thermal conductivity.

Figure 2:
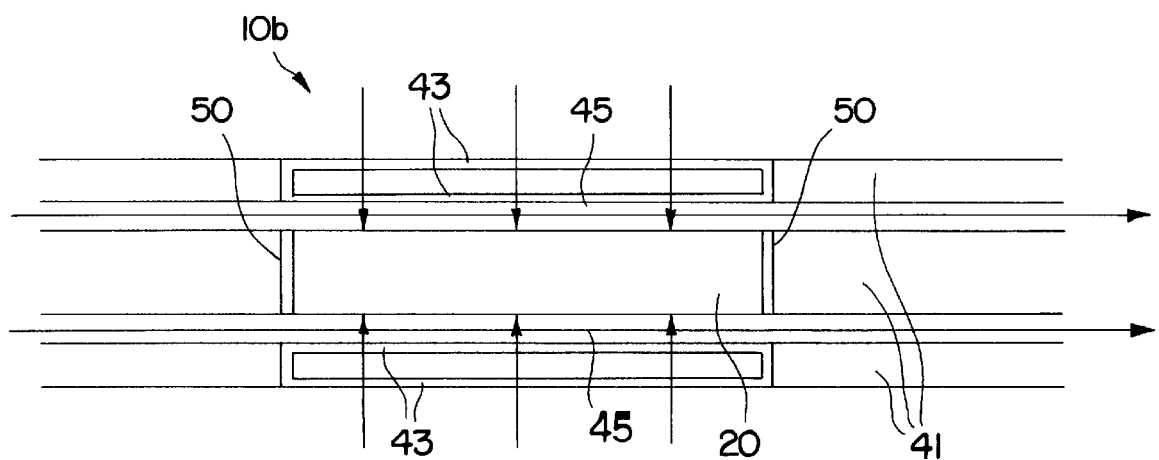
FIG. 2 is an end view, partly in schematic, of the modified embodiment of the cryogenically-cooled slab laser system of FIG. 1 incorporating transverse cooling in accordance with the present invention.

With reference to laser system 10b of FIG. 2, the glass or crystalline slab 20 is embedded in a material 41 such as metal or plastic that is insulated from the environment by the use of any good insulating material. The slab is pumped from the top and the bottom (in the direction of the arrows) through hollow plates 43. The plates 43 may be constructed from a glass, crystalline or ceramic material and enclose a vacuum or an insulating gas such as dry air. The slab 20 has optional side rails 50 to control the transverse flow of heat. The side rails may be passive or active. The hollow plates 43 should be AR coated to minimize pump losses and have good transmission at the pump wavelengths. A cryogenic cooling channel 45 is defined between the slab 20 and the inner plates 43. Cryogenic fluid is circulated through the channels 45. The cryogenic cooling fluid flow path is transverse to the slab in the direction of the horizontal arrows. The hollow plates may also be replace with a solid channel that has low thermal conductivity.

Figure 3:
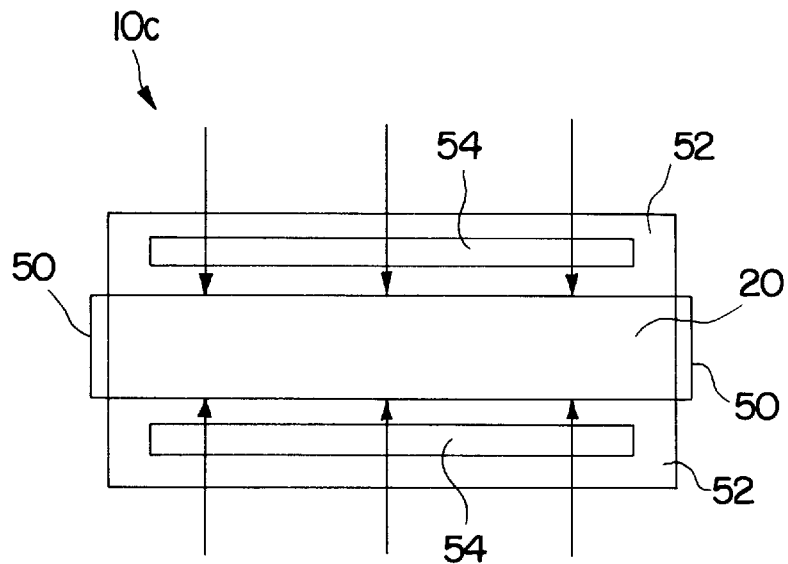
FIG. 3 is an end view, partly in schematic, of a second embodiment of a cryogenically-cooled slab laser system incorporating longitudinal cooling in accordance with the present invention.

With reference to FIG. 3, a high thermal conductivity optical material 52 such as sapphire is diffusion-bonded to the slab 20. The diffusion-bonded material must have good transmission at the pump wavelengths. The slab 20 may be YAG. The sapphire material 52 has plenum-like channels 54 which are conduits for cryogenic cooling. Cooling may also take place along any of the external sapphire surfaces. Optional slab side rails 50 which may be active or passive control the transverse flow of heat. The cryogenic cooling liquid flow path is longitudinal for the laser system 10c of FIG. 3 (orthogonal to the plane of the drawing). The arrows indicate the direction of the pumping for the pump source (not illustrated).

Figure 4:
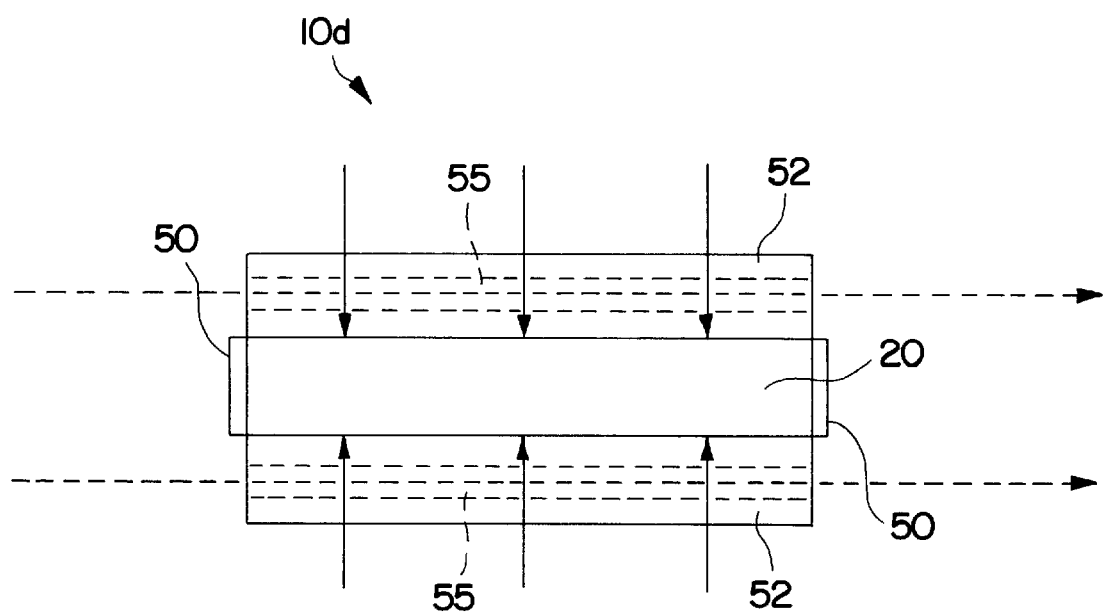
FIG. 4 is an end view, partly in schematic, of a modified embodiment of the cryogenically-cooled laser system of FIG. 3 incorporating transverse cooling in accordance with the present invention.

The cryogenic fluid flow is circulated in channels 55 transverse to the slab for the laser system 10*d* embodiment of FIG. 4, as illustrated by the broken line arrows.

Figure 5:
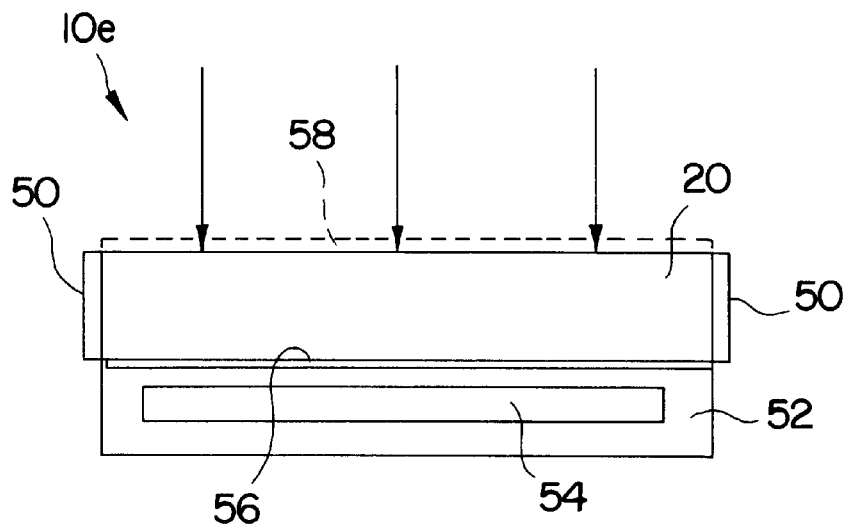
FIG. 5 is an end view, partly in schematic, of a third embodiment of a cryogenically-cooled laser system in accordance with the present invention.

A single-sided cooling of a slab 20 for a laser system 10*e*, such as illustrated in FIG. 5, may be acceptable. The slab is longitudinally cooled by circulating a cryogenic fluid through a diffusion-bonded material 52 such as sapphire or other crystalline material or metal such as copper or aluminum. Alternatively, the material may be bonded to the slab by use of a thin layer of adhesive 56. The slab has optional side rails 50 that may be passive or active. The slab front face may be in contact with air or may be insulated from the air by an optically clear (at the pump wavelengths) thermal insulator 58, such as glass or plastic. The insulator 58 should be AR coated at the pump wavelengths.

Figure 6:
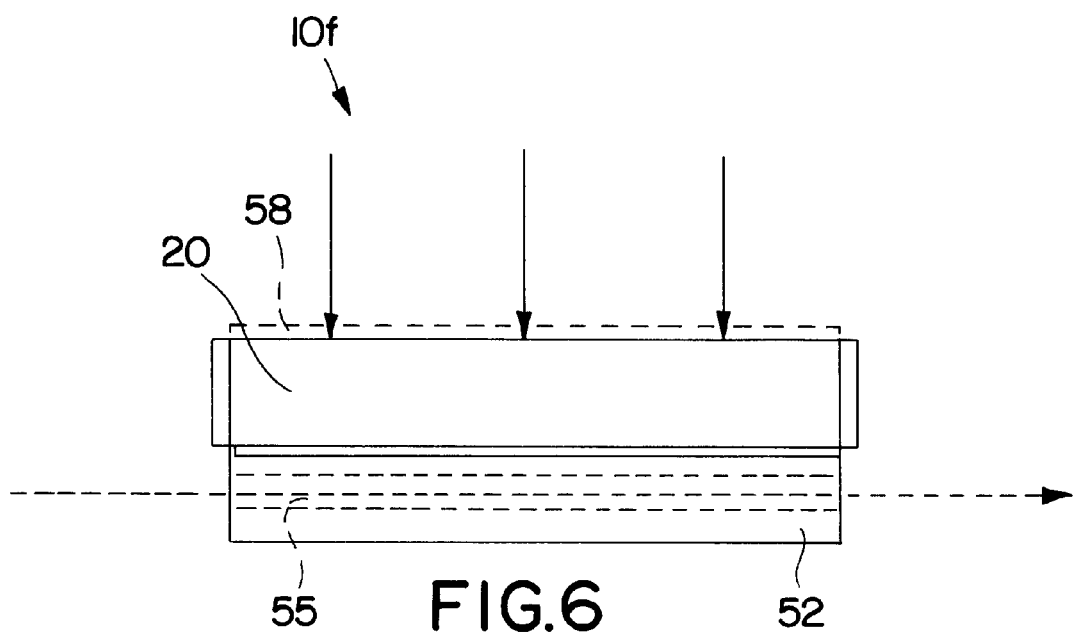
FIG. 6 is an end view, partly in schematic, of a modified embodiment of the cryogenically-cooled laser system of FIG. 5 in accordance with the present invention.

The laser system 10*f* of FIG. 6 is similar to the solid-state laser system 10*e* of FIG. 5 except that the cryogenic fluid flow path through channel 55 is transverse the longitudinal axis of the slab, as illustrated by the broken line arrows.

Figure 7A:
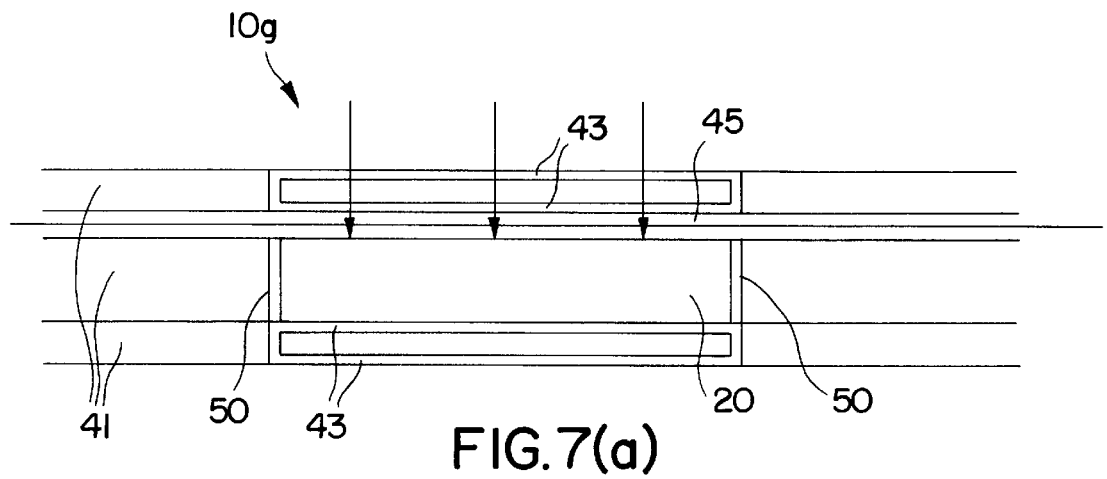
FIG. 7(a) is an edge view of a cryogenically-cooled active-mirror laser system in accordance with the present invention.
Figure 7B:
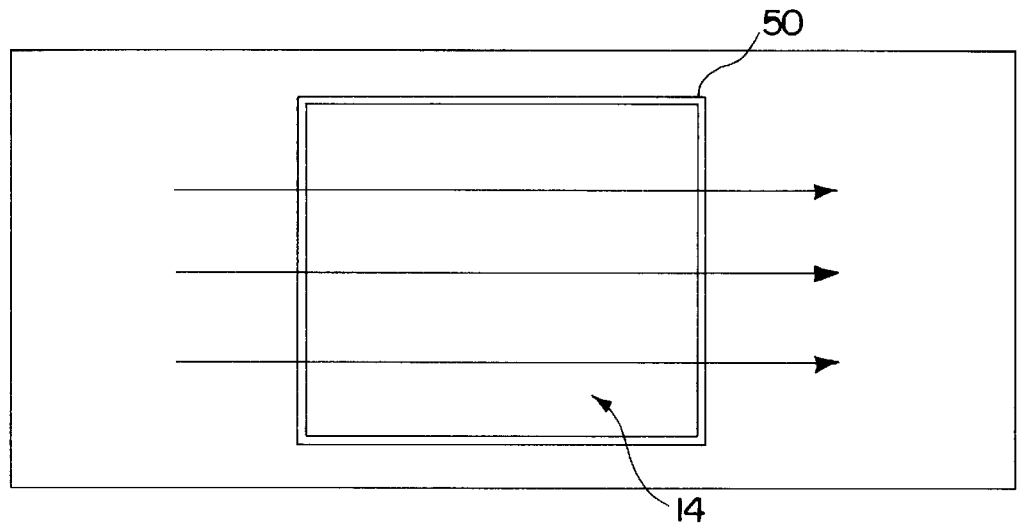
FIG. 7(b) is a front view of the active-mirror laser system of FIG. 7(a)

Laser system 10*g*, which comprises an active-mirror amplifier which is pumped from a single side, is illustrated in FIGS. 7(*a*) and 7(*b*). Cryogenic fluid is circulated transversely to the active-mirror slab 14. The slab 14 has a rear face coating that is a high-reflector at the laser wavelength and is also highly transmissive at the pump wavelengths. The active-mirror 14 front face coating is usually AR at the laser wavelength. The beam to be amplified enters at an angle or at normal incidence and passes the amplifying medium twice. If the front face spaced plates 43 are employed, they must be AR coated on all faces. Alternatively, the front face can be in contact with dry air or other gas or have a clear solid plate in contact with it that is AR coated. The active-mirror 14 may be round or rectangular in shape. The cryogenic fluid flow is denoted by the arrows in FIG. 7(*b*).

The laser systems illustrated in FIGS. 8–15 have pump chamber/lasing rod configurations adapted for cryogenic fluids which circulate in a longitudinal direction (orthogonal to the plane of the drawings) parallel to the longitudinal axis of the rod.

Figure 8:
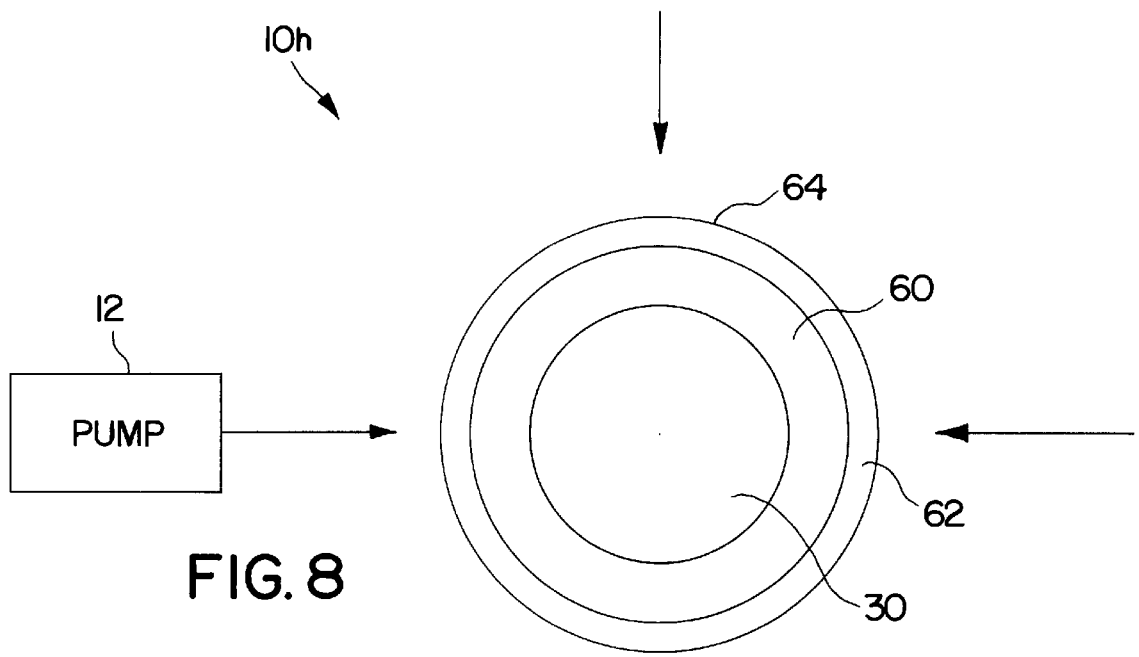
FIG. 8 is an end view, partly in schematic, of a cryogenically-cooled rod laser system in accordance with the present invention.

With reference to the laser system 10*h* of FIG. 8, a rod amplifier comprises a cylinder 30 of glass or crystalline laser material. The cylinder 30 is surrounded by a sheath of cryogenic fluid 60. The fluid is contained in a channel defined by an outside tubular conduit 62 made of glass or crystalline material that is thermally insulating. The tubular conduit 62 and cryogenic fluid 60 should be transparent at the pump wavelengths. The conduit 62 may be AR coated on the outside surface 64. The direction of pumping is denoted by the arrows.

Figure 9:
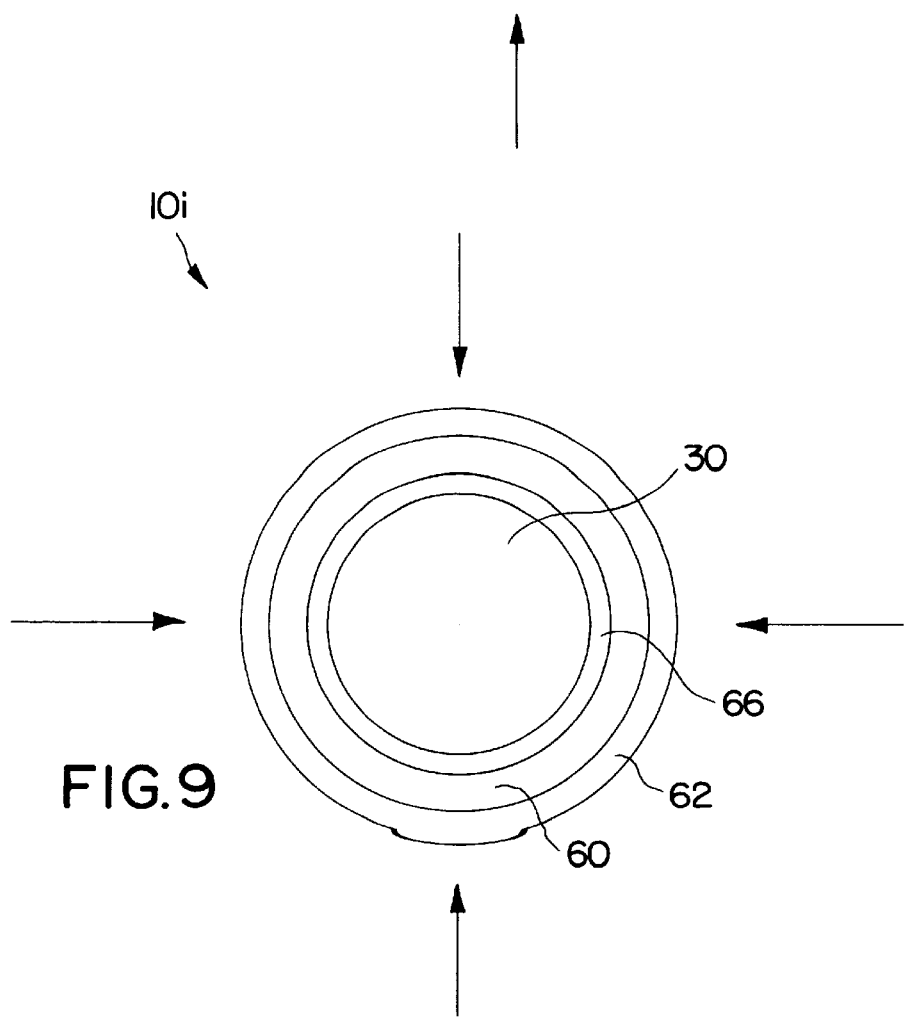
FIG. 9 is an end view of a second embodiment of a cryogenically-cooled rod laser system in accordance with the present invention.

With reference to the laser system 10*i* of FIG. 9, a sheath 66 of undoped YAG, sapphire, $Cr^{4+}$ doped YAG or other material is positioned around the rod 30. The sheath 66 can be an integral structure or be comprised of halves, quarters or strips that are diffusion-bonded or glued with an adhesive to the rod. Sapphire is an attractive material to use since it has a thermal conductivity much larger than YAG. $Cr^{4+}$ doped YAG is an attractive material to use to suppress the buildup of parasitic oscillations and amplified spontaneous emission in rod amplifiers. The ion is arbitrary but should be absorbing at the lasing wavelength.

Figure 10:
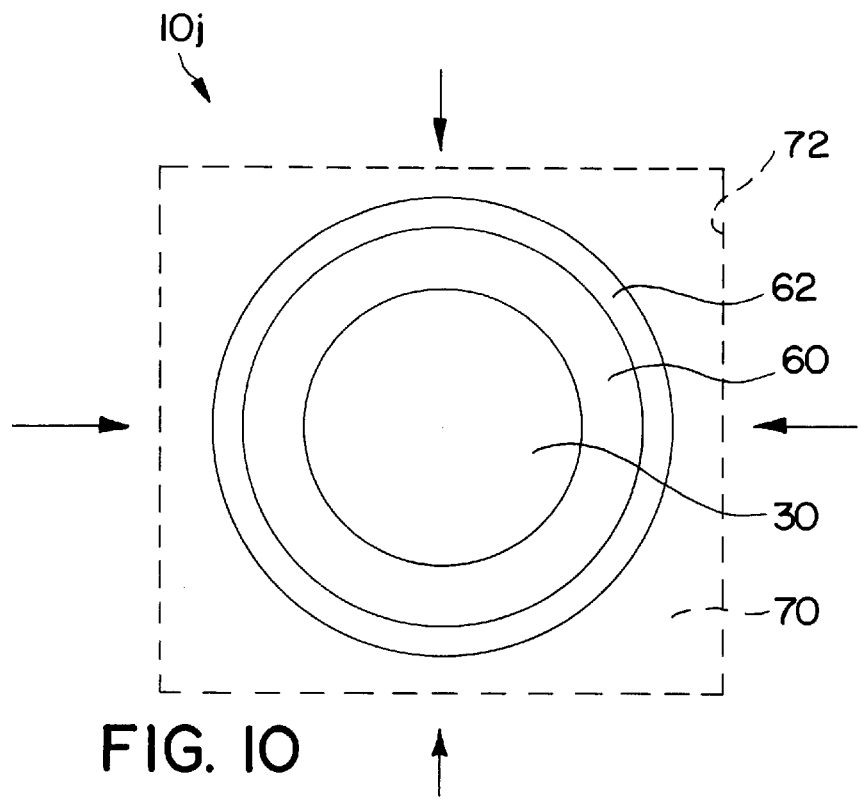
FIG. 10 is an end view, partly in schematic, of a third embodiment of a cryogenically-cooled rod laser system in accordance with the present invention.

With reference to FIG. 10, laser system 10*j* comprises a sheath of insulating gas 70 which surrounds the rod. The gas is received in a closed pump chamber 72. The gas could be dry air or a vacuum (which is essentially a low-pressure gas).

Figure 11:
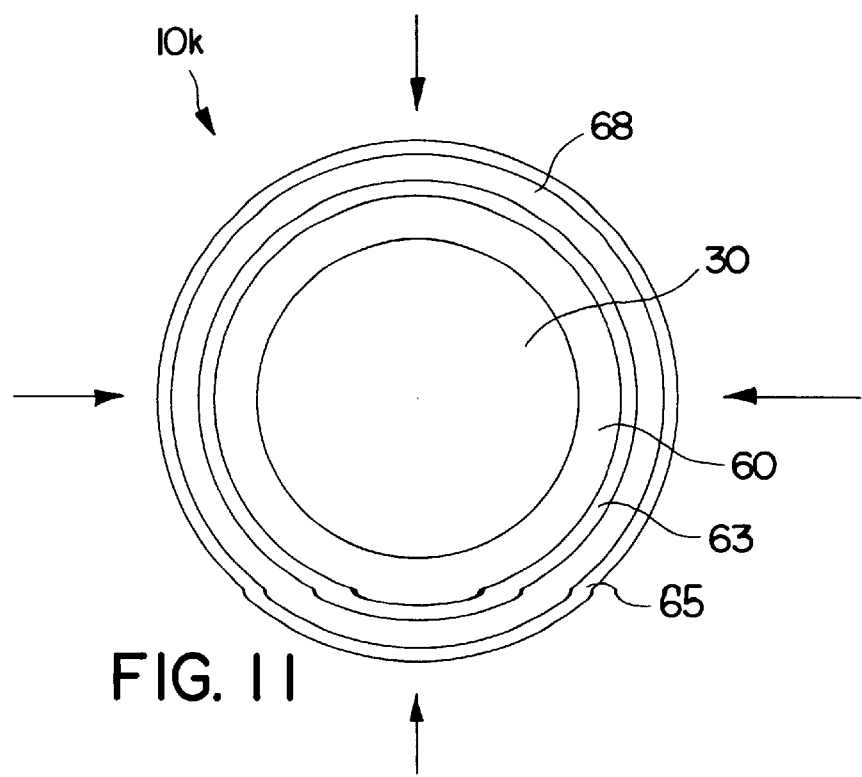
FIG. 11 is an end view of a fourth embodiment of a cryogenically-cooled rod laser system in accordance with the present invention.

With reference to the laser system 10*k* of FIG. 11, the solid outside sheath used in FIGS. 8–10 may be replaced by coaxial tubular inner and outer sheaths 63, 65. A hollow annulus 68 between the sheaths contains a vacuum or a gas such as dry air. This provides better insulation from the ambient environment. The sheaths should be AR coated on all surfaces to minimize pump losses, but practically only the outside surfaces can be coated.

Figure 12:
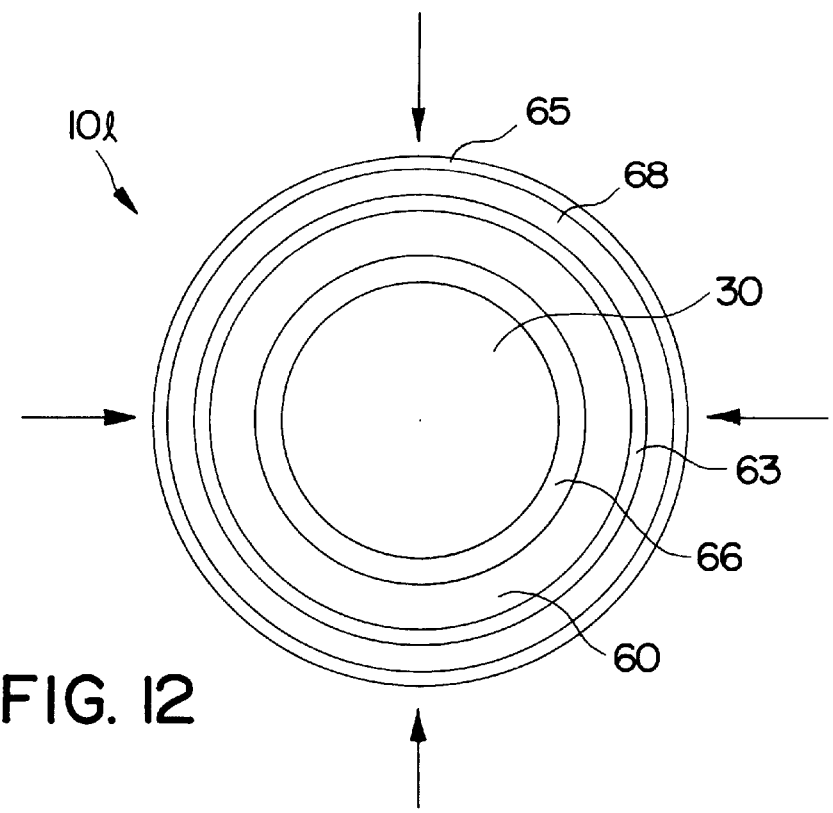
FIG. 12 is an end view of a fifth embodiment of a cryogenically-cooled rod laser system in accordance with the present invention.

The laser system 10*l* of FIG. 12 employs insulating sheaths 63, 65 and sheath 66 of solid material surrounding the rod 30. The solid sheath 66 can be an integral structure or can be constructed from half sections, quarter sections or strips that are diffusion-bonded or glued to the rod barrel 30.

Figure 13:
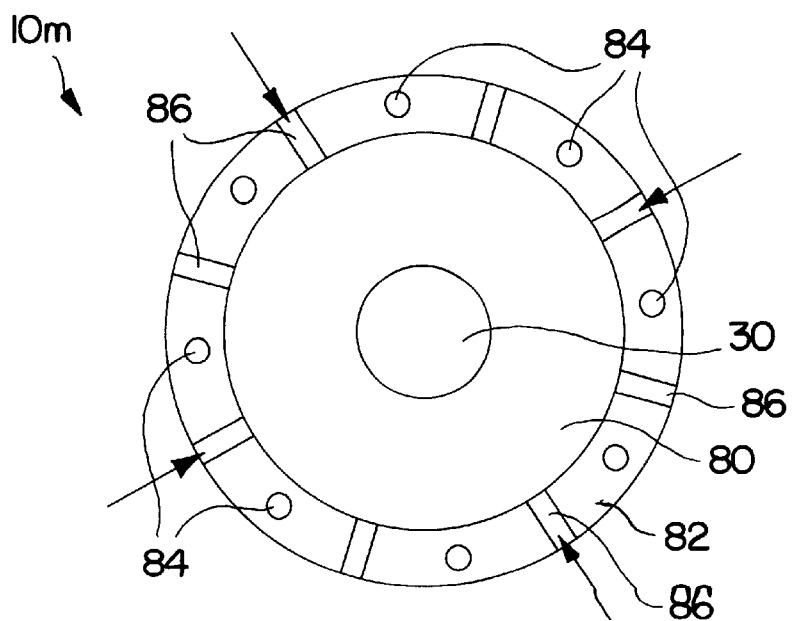
FIG. 13 is an end view of a sixth embodiment of a cryogenically-cooled rod laser system in accordance with the present invention.

With reference to FIG. 13, the solid-state laser system 10*m* comprises a transparent sheath 80 of solid material which surrounds the rod 30. The material could be diffusion-bonded or glued sapphire. An outer sleeve 82 engages the outside circumference of sheath 80. The sleeve 80 may be metallic or ceramic and contains longitudinal cooling channels 84 to circulate a cryogenic fluid. If the sleeves are not transparent, as when made with Cu, for example, pumping is achieved by focusing the pump light through narrow radial slots 86 longitudinally traversing the sleeve. The cryogenic cooling flow is parallel to the longitudinal axis of the rod.

Figure 14:
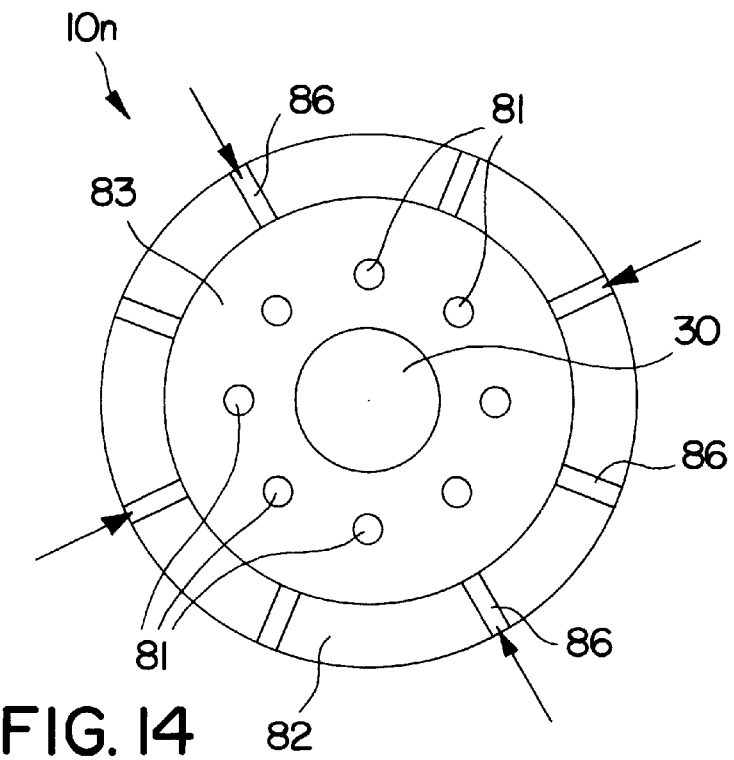
FIG. 14 is an end view of a seventh embodiment of a cryogenically-cooled rod laser system in accordance with the present invention.

Alternately, longitudinally extending, cryogenic cooling channels 81 are formed in the solid optically clear sheath 83 surrounding the rod 30 as illustrated for laser system 10*n* in FIG. 14. Coolant flow is parallel to the longitudinal axis of the rod.

Figure 15:
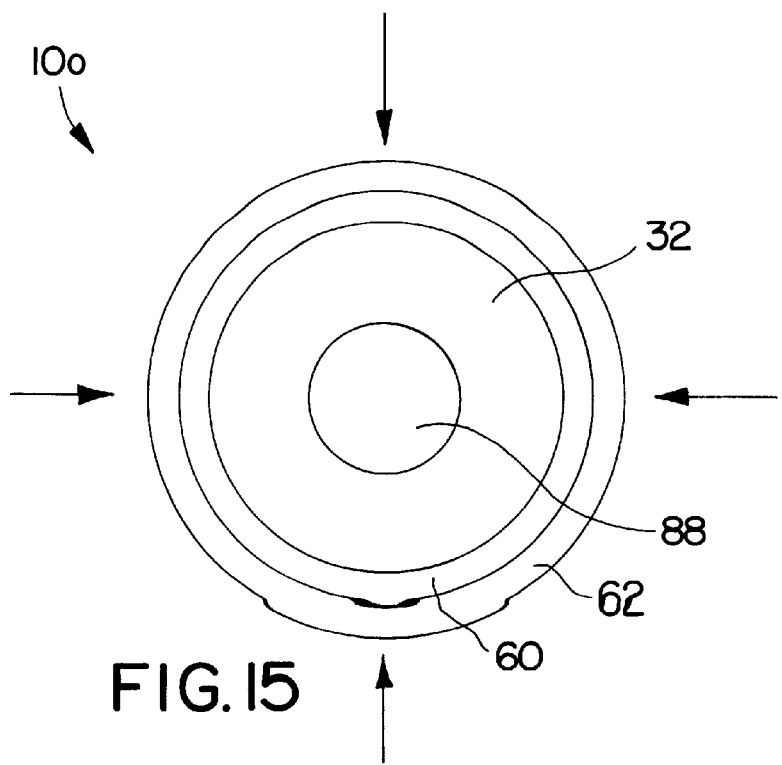
FIG. 15 is an end view of an eighth embodiment of a cryogenically-cooled rod laser system in accordance with the present invention.

An annular rod amplifier laser system 10*o* is illustrated in FIG. 15. The rod 32 defines a central cooling channel 88. A sleeve 62 defines the second channel 60. The coolant flow through the channels may be in the same or opposite directions. This arrangement has much larger average power capability and less distortion than a classical rod amplifier.

Figure 16:
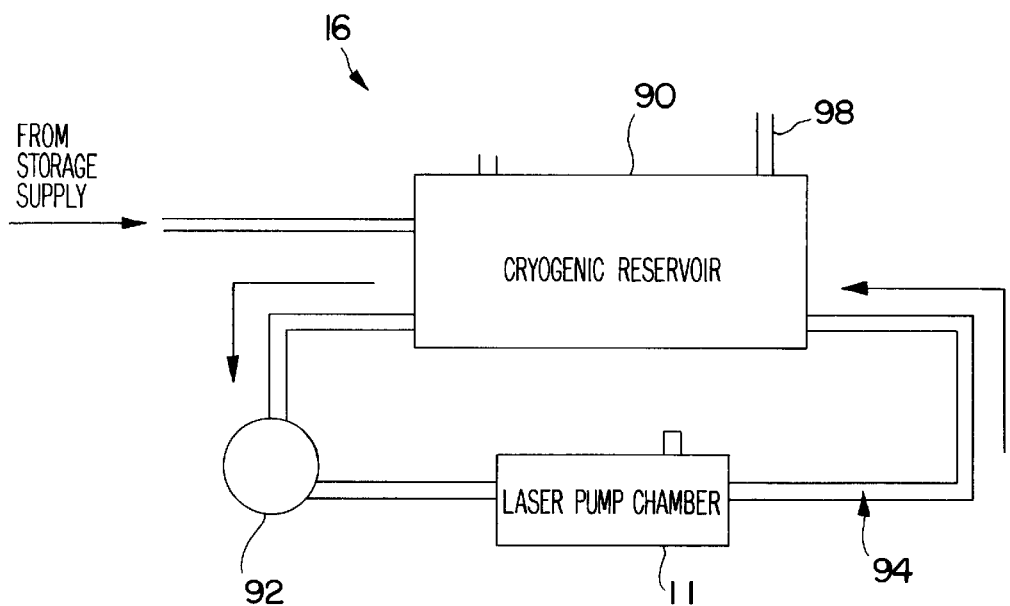
FIG. 16 is a schematic block diagram illustrating an open-loop cryogenically-cooled solid-state laser system in accordance with the present invention.

A cryogenically cooled, solid-state laser system 16 which employs an open-loop cooling system is schematically illustrated in FIG. 16. The system comprises a cryogenic reservoir 90, the laser pump chamber 11 (that may be a rod, slab, active-mirror or disc amplifier and incorporate the configurations of laser systems 10*a*–10*o*), a circulating cryogenic pump 92 and insulated flow lines 94. The entire system is insulated to minimize heat leaking into it. Relief valves ensure that any pressure buildup is safely vented to the atmosphere. Heat generated in the pump chamber 11 and heat leaking into the system from ambient converts the cryogenic fluid into gas that is vented to the atmosphere via atmospheric vent 98. Used fluid is replaced from the storage supply. The cryogenic reservoir 90 is constructed so that bubbles do not recirculate through the pump chamber. The arrows indicate the cryogenic fluid flow. The entire system is designed to provide enough flow to effectively remove the heat from the lasing element and minimize the temperature drop from one end of the lasing element to the other. It also provides sufficient pressure in the pump chamber to keep the cryogenic fluid from boiling or converting to gas until after it has passed out of the pump chamber 11. This system is open-loop since it vents used fluid to the atmosphere instead of recycling the gas back into a fluid.

Figure 17:
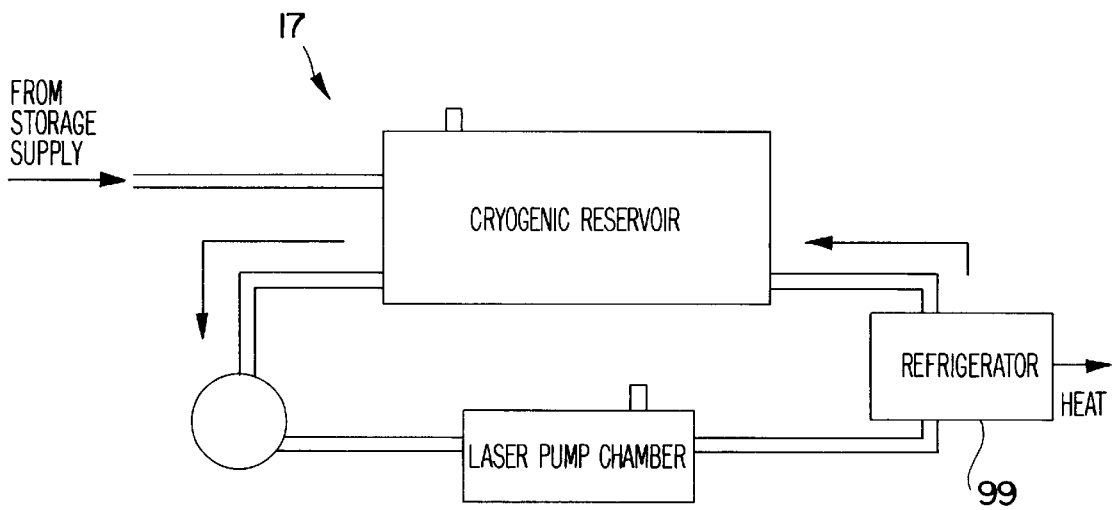
FIG. 17 is a schematic block diagram illustrating a closed-loop cryogenically-cooled solid-state laser system in accordance with the present invention.

A cryogenically cooled, solid-state laser system 17 which employs a closed loop system is illustrated in FIG. 17. This system 17 is essentially identical to that of FIG. 6 except that a refrigerator 99 is added to recycle the cryogenic fluid converted to gas back into fluid.

For the disclosed laser systems 10*a*–10*g*, the side rails 50 may be insulating, partially thermally conducting or good conductors. The side rails 50 can be solid or hollow and in some embodiments can be constructed from a material doped with an absorber that absorbs amplified spontaneous emission (ASE) incident from the slab 20. The hollow side rails may be filled with air, a vacuum, a cryogenic material or other liquid or gas. The side rails 50 may be actively cooled by flowing a coolant through them, or they may be passively cooled. The side rails may cover all or part of the edges of the slab 20.

Liquid nitrogen ($LN_2$) is the preferred cryogenic fluid for the disclosed embodiments. $LN_2$ is transparent to visible and near-infrared light and completely transparent from 600–1100 nm which is the region of emission for most diode arrays. Liquid air or any other transparent cryogenic fluid may be used.

The laser crystal or glasses most preferred for the slabs 20 or rods 30 would be Nd:YAG, Yb:YAG, Er:YAG, Tm:YAG, Ho:YAG, Tm,Ho:YAG, Tm,Ho,Cr:YAG, Cr:YAG and any other laser ion doped into YAG. Another preferred material is Ti:Sapphire. Any laser material, whose thermal conductivity increases and thermal expansion coefficient decreases as temperature is lowered into the cryogenic temperature region below 165.1° K, is preferred.

Insulated construction material is generally used to construct the pump chamber 11 which includes mounting and sealing of the laser rod 30 or slab 20, provision for forced or active-cooling and communication with an optical pumping means 12 such as a diode array. The preferred construction material comprises common metals like copper, indium, stainless steel and titanium and possibly low conductivity plastics or ceramics with insulation bonded to the outside surfaces which are exposed to the ambient environment at room temperature. Another possibility is to completely surround the pump chamber with an inert gas that has a very low thermal conductivity. Typical suitable insulating materials would be expanded perlite, silica aerogel, fiberglass, mineral or rock wool, silicone rubbers, foamglass, vermiculite and others. Preferably, the materials are non-hygroscopic.

The insulating pipes 94 for the cryogenic lines may be metallic, ceramic or plastic and surrounded with insulating materials such as previously described. The cryogenic fluid is circulated at a rate that is sufficient so that pressurized liquid nitrogen, for example, removes a sufficient amount of heat but has a temperature rise that does not lead to boiling of the liquid nitrogen until after passage out of the pump chamber 11. This is an example of an open loop system as illustrated in FIG. 6. When the heated liquid arrives in the reservoir and is returned to atmospheric pressure, some liquid boils off and forms a vapor that is vented to the atmosphere. This cyclical process requires that the liquid nitrogen be replenished at a constant rate.

The closed-loop system 17 (illustrated in FIG. 17) employs a refrigerator 99 which removes the heat transferred to the liquid nitrogen by the pumped rod or slab, and the cooled liquid is then returned to the cooling loop. Even in a closed-loop system, some liquid is required to be replenished over time. Both the open and closed-loop systems incorporate safety devices, including pressure relief valves 96, at certain locations where the pressures may get unacceptably high.

The favorable output power characteristics for the described cryogenically cooled laser systems can be demonstrated. For example, the average power capability for a rod or slab of YAG is significantly greater at 77° K, the temperature associated with liquid nitrogen, than at 300° K, the room temperature.

When the temperature of the cooling fluid surrounding the barrel is reduced to the cryogenic range, e.g. below 165° K, the thermal expansion coefficient becomes smaller while the thermal conductivity increases significantly. Poisson's ratio and Young's modulus vary by 2% and 7%, respectively, over the same temperature range and can be regarded as constants. When the variation of thermal expansion coefficient and thermal conductivity are taken into account when calculating the stresses produced in the rod 30 or slab 20, they are significantly lower at 77° K. Because of this, the rod or slab can be pumped much harder before once again the stresses on the barrel become equal to the fracture stress. Thus, the average power capability of a rod or slab at cryogenic temperatures is significantly greater than at room temperature. An identical sized laser rod or slab can then produce much greater average power at cryogenic temperatures than at room temperatures. Consequently, the cryogenically cooled laser systems can provide small powerful solid-state YAG lasers that can be scaled to ultrahigh average powers from single elements. Also, because the power scaling is so significant, the cryogenic cooling, as described, can be extrapolated to the operation of compact solid-state lasers with output powers greater than 1 MW (million watts) that can replace chemical lasers for some applications. Lower power versions of these lasers may be extremely useful as compact sources for laser materials processing. The most powerful current solid-state laser produces about 5 kW. Materials processing requires solid-state lasers with 2–30 kW output power.

Figure 18:
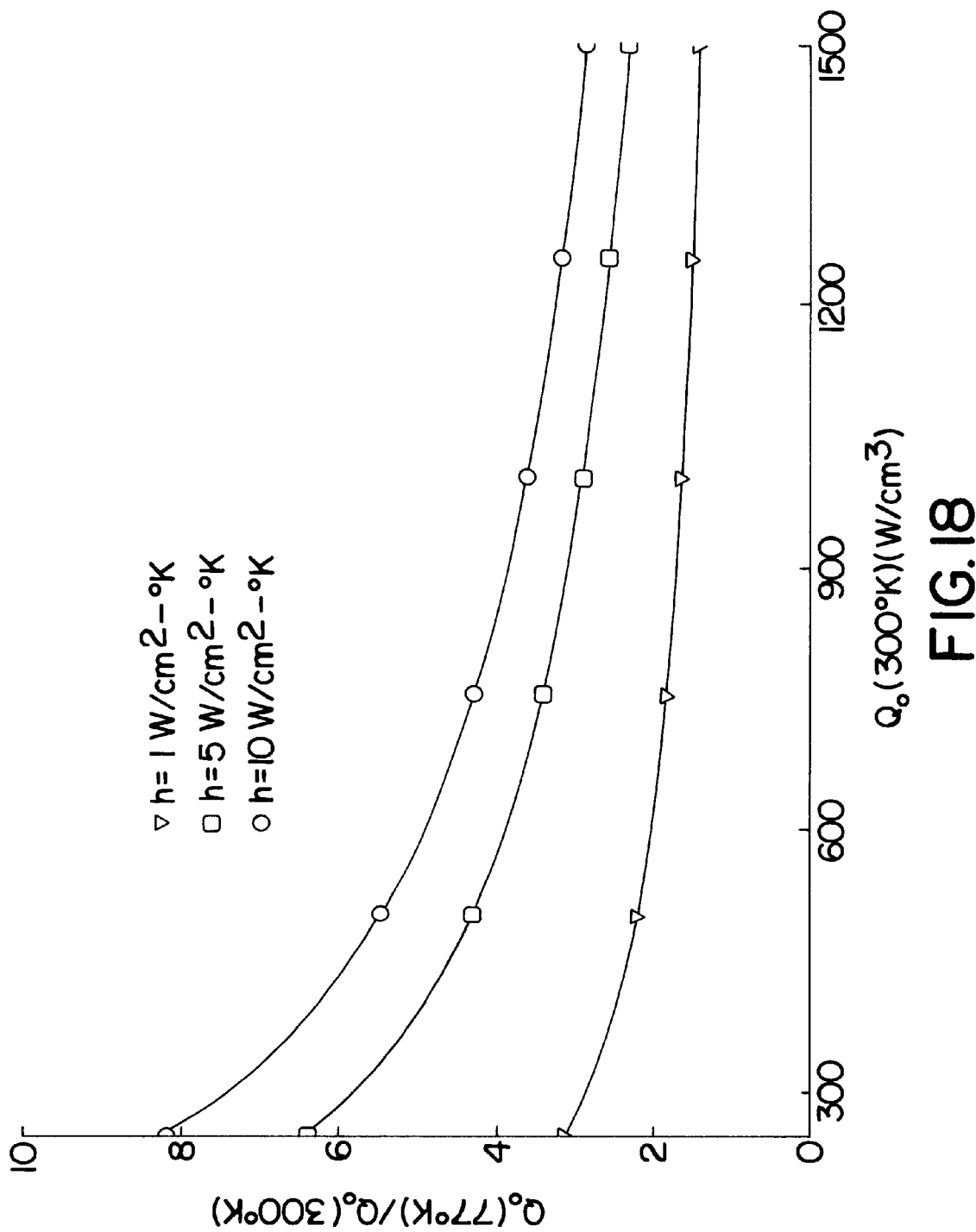
FIG. 18 is a representative graph of the heat density $Q_o$ (W/cm$^3$) at 77° K to that at 300° K for a rod diameter of 4 mm and three common values for the surface heat transfer coefficient h (1, 5 and 10 W/cm$^2$-K)

FIG. 18 shows the ratio of the heat density $Q_o$ ($W/cm^3$) at 77° K to that at 300° K for a rod diameter of 4 mm and three common values for the surface heat transfer coefficient h (1, 5 and 10 $W/cm^2$–K). The 1, 5 and 10 values are the respective bottom, center and top lines in the graph. It can be concluded that for all heat power densities examined, which bracket normal laser operation, as much as an 8 times improvement in the amount of heat that can be tolerated is obtained at 77° K. The curve was obtained by calculating, with a nonlinear thermal/stress finite-element code, the heat needed to produce equal stress at 300° K and 77° K and then taking the ratio. Because the extractable optical average power is proportional to the heat density in the rod, the results from FIG. 18 (and others not shown for different rod diameters) can be employed to produce universal curves of the average power obtainable from a given diameter rod at 300° K and 77° K.

Figure 19:
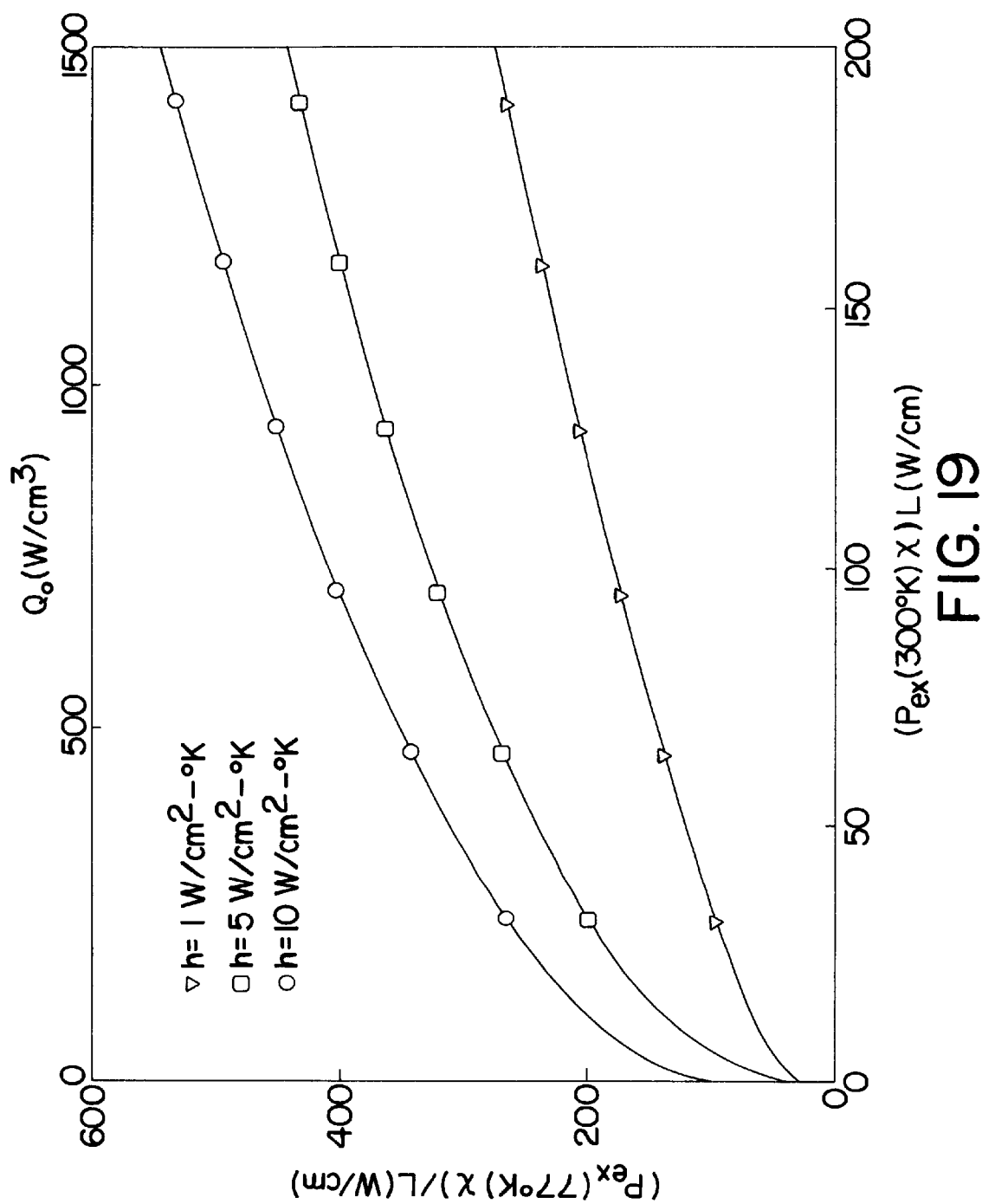
FIG. 19 is a representative graph which shows the average power obtainable at 77° K vs. that obtainable at 300° K for a rod diameter of 4 mm and three common values for the surface heat transfer coefficient h (1, 5 and 10 W/cm$^2$-K)

FIG. 19 is a representative graph which shows the average power obtainable at 77° K vs. that obtainable at 300° K for a 4 mm rod and three common values for the surface heat transfer coefficient h (1, 5 and 10 $W/cm^2$–K). The 1, 5 and 10 values are the respective bottom, center and top lines in the graph. The quantity plotted is the normalized extractable power (Pex X/L) where the quantity X is the ratio of heat power density/inversion power density produced in YAG and L is the rod length. For all diameters examined, significant increases in average power are possible by operating the rod at 77° K.

The lasing material for the rods or slabs, for which the cryogenic-cooling has particular advantages, is preferably composed of either of two lasing ions in YAG, Nd:YAG and Yb:YAG. Nd is the most commonly used ion but recently Yb has come to the fore because it produces only about ⅓ the amount of heat in the pumping/lasing process as Nd. Yb:YAG is rapidly becoming the material of choice. Other ions such as Tm, Er, etc. have also been used in YAG. The common feature here is the use of the robust material YAG. Since the thermo-mechanical properties of YAG are only influenced in a minor way by the presence of ions, the average power scaling applies to any lasing ion in YAG. Performance predictions for Nd:YAG and Yb:YAG can be calculated. For known values of X and an assumed polished barrel, calculations show that for a common 6" (15.24 cm) long rod Nd:YAG can produce 18 kW for an 8 mm diameter, while for Yb:YAG 64 kW is possible, both at 77° K. At room temperature, the same rod can produce up to 3.8 kW for Nd:YAG and up to 13 kW for Yb:YAG, at 300° K.

Suitable lasing ions for the solid-state lasers of the present invention can be selected from the group consisting of Nd, Yb, Er, Pr, Gd, Eu, Ce, Sm, Dy, Co, Tm, Ho, Cr and Ti.

Figure 20:
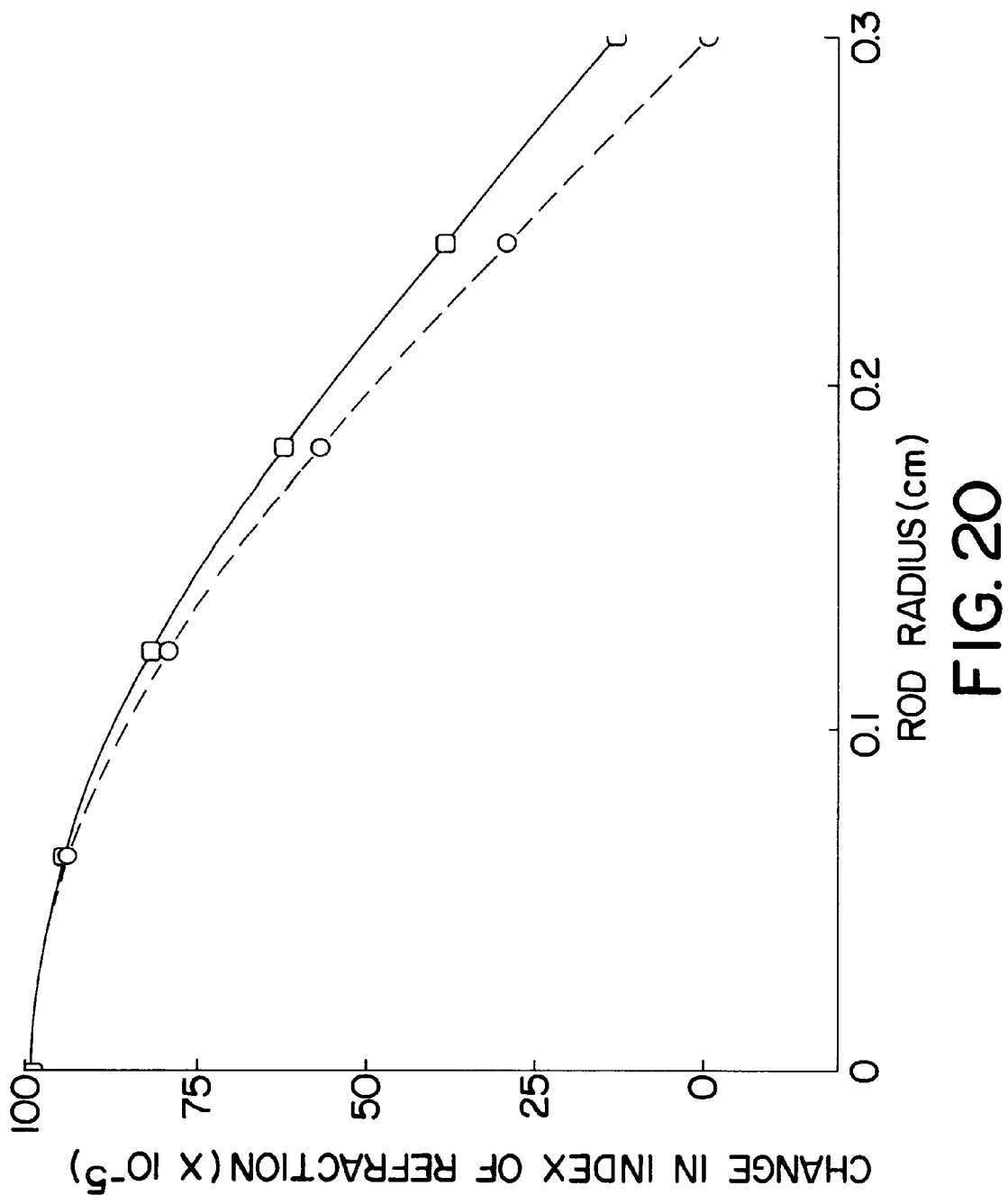
FIG. 20 is a representative graph which illustrates the change in total index of refraction as a function of rod radius for a 6 mm diameter YAG rod, 300° K coolant temperature, a heat power density of 250 W/cm$^3$ and a heat transfer coefficient of 5 W/cm$^2$-K.
Figure 21:
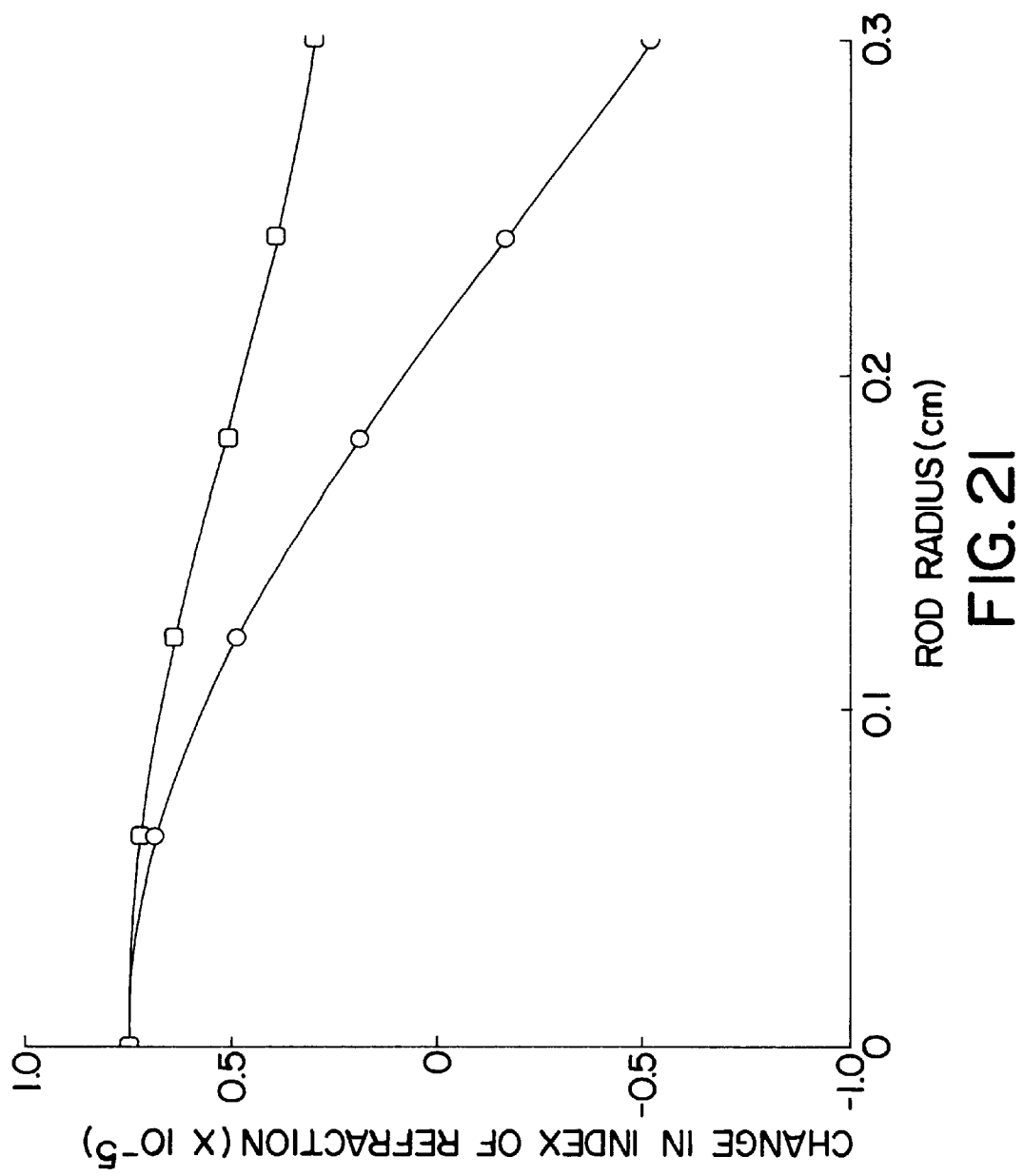
FIG. 21 is a representative graph which illustrates the change in total index of refraction as a function of the YAG rod radius for a rod diameter of 6 mm, heat power density of 250 W/cm$^3$, heat transfer coefficient of 5 W/cm$^2$-K and a coolant temperature of 77° K.

The graphical representations of FIGS. 20 and 21 illustrate that the cryogenic cooling feature of the invention also results in significant favorable thermal distortion characteristics for the lasing elements.

FIG. 20 is a representative graph which shows the change in total index of refraction as a function of rod radius for a 6 mm diameter YAG rod, 300° K coolant temperature, a heat power density of 250 W/cm$^3$ and a heat transfer coefficient of 5 W/cm$^2$-K. Discrete points represent finite-element results obtained for the radial (○) and tangential (□) polarizations. The solid and dashed curves represent the best fits to the discrete points for the tangential and radial polarizations respectively.

FIG. 21 is a representative graph which shows the change in total index of refraction as a function of the YAG rod radius for a rod diameter of 6 mm, heat power density of 250 W/cm$^3$, heat transfer coefficient of 5 W/cm$^2$-K and a coolant temperature of 77° K. Discrete points for the radial (○) and tangential (□) polarizations were generated using finite-element analysis. Solid curves are drawn through discrete points for illustrative purposes only.

A comparison of the graphs of FIGS. 20 and 21 illustrates that the thermal distortion of the YAG rod is improved by a factor on the order of 100 when the rod is cooled from room temperature to cryogenic temperature of 77° K.

The cryogenic cooling can be applied to numerous types of optically-pumped solid-state laser amplifiers using a wide variety of geometries.

While preferred embodiments of the invention have been set forth for purposes of describing the invention, the foregoing descriptions should not be deemed a limitation of the invention herein. Accordingly, various modifications, adaptations and alternatives may be made without departing from the spirit and the scope of the present invention.

What is claimed is:

1. A method for increasing the extractable average power capability of a solid-state laser having a lasing material, comprising cooling the lasing material to a cryogenic temperature during operation of the laser to simultaneously increase the thermal conductivity and decrease the thermal expansion coefficient.

2. The method of claim 1 further comprising circulating cryogenic fluid along a path which is in direct intimate heat exchange relationship with the lasing material.

3. The method of claim 2 wherein the lasing material has a rod-like form defining a longitudinal axis and the cryogenic fluid path is generally parallel to the longitudinal axis.

4. The method of claim 2 wherein the lasing material has a slab-like configuration defining a plane and the cryogenic fluid path is generally parallel to said plane.

5. The method of claim 2 further comprising pumping the lasing material along a radiation path that traverses through said cryogenic fluid.

6. The method of claim 1 further comprising cooling the lasing material with liquid nitrogen.

7. The method of claim 1 wherein the material for the lasing material comprises YAG and wherein the lasing ions are selected from the group consisting of Nd, Yb, Er, Pr, Gd, Eu, Ce, Sm, Dy, Co, Tm, Ho, Cr and Ti.

8. The method of claim 1 wherein the cryogenic temperature is on the order of 77° K.

9. A laser system comprising:

a lasing element composed of lasing material having a thermal conductivity which increases and a thermal expansion coefficient which decreases as the temperature of the lasing material is lowered;

means for cooling said lasing element to cryogenic temperatures;

means for pumping said lasing element;

wherein the temperature of the lasing element is lowered to cryogenic temperatures as the lasing element is pumped, whereby the extractable average power output of the system is increased.

10. The laser system of claim 9 wherein said lasing element is of a type selected from the group consisting of a rod, a slab, an active-mirror and a disc amplifier.

11. The laser system of claim 9 wherein said lasing element comprises a material selected from the group consisting of YAG, sapphire, a crystalline lasing material and glass.

12. The laser system of claim 9 wherein said lasing element comprises a solid-state laser material incorporating one or more of the lasing ions selected from the group consisting of Nd, Yb, Er, Pr, Gd, Eu, Ce, Sm, Dy, Co, Tm, Ho, Cr and Ti.

13. The laser system of claim 9 wherein said pumping means comprises a laser pump selected from the group consisting of a diode, a diode array, a flashlamp and a laser.

14. A lasing system comprising:

a laser pump chamber;

a solid-state lasing element composed of lasing material having a thermal conductivity which increases and a thermal expansion coefficient which decreases as the temperature of the lasing material is lowered into a cryogenic temperature region disposed in said pump chamber;

a cryogenic reservoir; and a circuit connecting said pump chamber and said cryogenic reservoir, whereby a cryogenic fluid is circulated to said pump chamber for cooling said lasing element to cryogenic temperatures.

15. The laser system of claim 14 wherein said reservoir, said pump chamber and said circuit form a closed loop system.

16. The laser system of claim 14 further comprising a refrigerator disposed in said circuit.

17. The laser system of claim 14 further comprising path means for defining a cryogenic flow path in said pump chamber, said path being disposed in heat exchange relationship with said lasing element.

18. The laser system of claim 17 wherein said lasing element has a rod-like configuration defining a longitudinal axis, and said flow path is parallel to said longitudinal axis.

19. The laser system of claim 17 wherein said pump chamber further comprises an insulator structure for insulating the flow path from the ambient environment.

20. The laser system of claim 17 wherein said lasing element has a slab configuration, and further comprising means for defining a cryogenic flow path on each side of said slab.

21. The laser system of claim 17 further comprising a pump for optically pumping said lasing element at a pump wavelength wherein said flow path means comprises spaced layers of material which are optically transparent at the pump wavelength.

22. The laser system of claim 1 further comprising a pump and wherein said lasing element has opposed first and second sides, said element being pumped by said pump from said first side, and said cryogenic coolant path being disposed at said second side.

23. A method for decreasing the thermal distortion of a solid-state laser having a lasing material comprising cooling the lasing material to a cryogenic temperature during operation of the laser to simultaneously increase the thermal conductivity and decrease the thermal expansion coefficient.

24. The method of claim 1 whereby thermal distortions are reduced by at least a factor of ten as the temperature of the lasing material is cooled into the cryogenic temperature region.

* * * * *